United States Patent
Lebas et al.

[11] Patent Number: 5,979,180
[45] Date of Patent: Nov. 9, 1999

[54] PROCESS AND DEVICE FOR TREATING A GAS BY REFRIGERATION AND CONTACT WITH A SOLVENT

[75] Inventors: Etienne Lebas; Alexandre Rojey, both of Rueil Malmaison, France

[73] Assignee: Institut Francais du Petrole, Cedex, France

[21] Appl. No.: 08/994,991

[22] Filed: Dec. 19, 1997

[30] Foreign Application Priority Data

Dec. 19, 1996 [FR] France ............................ 96 16328

[51] Int. Cl.⁶ .................................................. F25J 3/00
[52] U.S. Cl. ............................. 62/632; 62/635; 62/929
[58] Field of Search .......................... 62/632, 634, 635, 62/928–929

[56] References Cited

U.S. PATENT DOCUMENTS 3,824,766  7/1974  Valentine et al. .
4,528,002  7/1985  Linde .

FOREIGN PATENT DOCUMENTS

707880  4/1996  European Pat. Off. .
2550956  3/1985  France .

*Primary Examiner*—Christopher B. Kilner
*Attorney, Agent, or Firm*—Antonelli, Terry, Stout & Kraus

[57] ABSTRACT

Process for treating a gas comprising one or more constituents to be separated, wherein the gas to be processed (G) is mixed at least partly with a solvent S selected to selectively retain at least part of the gas constituents to be separated, the mixture of gas (G) and of solvent (S) is cooled by circulating in at least one heat exchange zone so as to obtain, at the outlet of said heat exchange zone, at least a gas phase ($G_1$) depleted in at least one of the constituents to be separated and a solvent phase ($S_1$) enriched in said constituents, said enriched solvent phase ($S_1$) is separated from said gas phase ($G_1$) and it is recycled to the heat exchange zone in order to cool said gas-solvent mixture (stage b), said solvent phase ($S_1$) consisting, at the outlet of the heat exchange zone, of at least a gas phase ($G_2$) enriched in the constituents to be separated and of a liquid solvent phase (S), the gas phase ($G_2$) and the liquid solvent phase (S) from stage (c) are separated and the solvent phase at least freed of the constituent(s) is recycled to the initial mixing stage.

13 Claims, 7 Drawing Sheets

PROCESS AND DEVICE FOR TREATING A GAS BY REFRIGERATION AND CONTACT WITH A SOLVENT

FIELD OF THE INVENTION

The present invention relates to a process and to a plant for treating a gas comprising unwanted constituents and notably for processing a natural gas in order to remove all or at least most of the constituents that may be harmful to the transportation or to the use thereof.

BACKGROUND OF THE INVENTION

A gas produced in an industrial plant, for example from a refinery, can comprise constituents that are considered to be unwanted during the transportation and/or the use thereof. Such constituents are, by way of non limitative example, acid gases such as $CO_2$, or $H_2S$, or an inert gas such as nitrogen.

Figure 1:
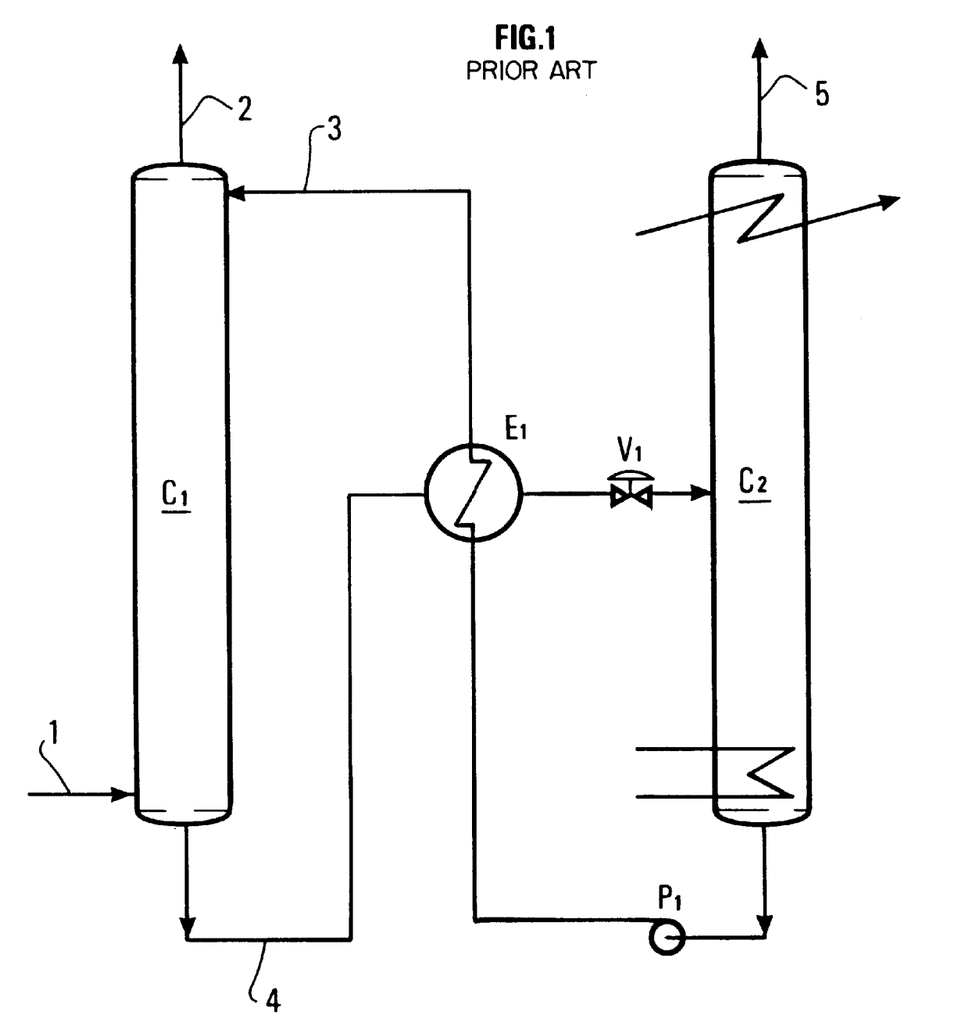
FIG. 1 diagrammatically shows a treating process according to the prior art.

A commonly used processing method consists in carrying out an absorption stage by bringing the gas to be processed into countercurrent contact with a solvent in a column, the solvent allowing notably to extract selectively one or more constituents contained in the gas, then in regenerating the solvent by distillation under reduced pressure. Such a method of operation, detailed in FIG. 1, is more particularly suited to remove impurities or at least to separate one or more constituents present in relatively small amounts in the gas. It consists in precooling the gas to be processed and in using a solvent at low temperature to carry out the absorption stage. However, such a process can become costly when the constituent content is high, on account of the necessity of circulating and of distilling large amounts of solvent with a high content of constituents to be separated from the gas to be processed. In fact, distillation of the solvent is generally a relatively expensive operation which requires heating the column at the bottom and cooling it at the top.

A new gas processing method which overcomes the drawbacks of the prior art and which notably allows to decrease the solvent processing cost and the amount necessary to process the gas has been discovered. Such a process is particularly well-suited when the gas constituent(s) is or are present in relatively large proportions.

SUMMARY OF THE INVENTION

The process according to the invention notably consists in carrying out, in a single exchange zone, absorption of the constituents contained in the gas and regeneration of the solvent used to absorb the constituents.

The present invention thus relates to a process for treating a gas G comprising one or more constituents to be removed. It is characterized in that it comprises at least the following stages:

(a) the gas to be processed G is mixed at least partly with a solvent S selected to retain selectively at least one of the gas constituents, said solvent S coming at least partly from stage (d), (b) the mixture of gas G and of solvent S is cooled by circulating in at least one heat exchange zone so as to obtain, at the outlet of said heat exchange zone, at least a gas phase $G_1$ depleted in at least one of the constituents to be separated and a solvent phase $S_1$ enriched in constituents to be separated, (c) said enriched solvent phase $S_1$ is separated from said gas phase $G_1$, said enriched solvent phase $S_1$ being recycled to the heat exchange zone to cool the gas-solvent mixture (stage b), said solvent phase $S_1$ consisting, at the outlet of the heat exchange zone, of at least a gas phase $G_2$ enriched in constituents to be separated and of a liquid solvent phase S, and (d) the gas phase $G_2$ and the liquid solvent phase S from stage (b) are separated and the solvent phase at least freed of the constituent(s) to be separated is recycled to stage (a).

According to an embodiment, at least part of said solvent phase $S_1$ from stage (c) is expanded prior to being recycled to stage (b).

The gas-solvent mixture and the solvent phase used as a cooling agent circulate for example within the heat exchange zone in a countercurrent flow.

According to an embodiment of the invention, at least part of the gas phase $G_1$ from stage (b) is cooled, preferably by expansion in a turbine, and it is fed for example into the heat exchange zone in order to cool the gas-solvent mixture.

According to an embodiment, at least part of said solvent phase $S_1$ from stage (c) is sent to a complementary regeneration stage carried out by expansion and/or heating and/or distillation.

When stage (c) is completed, a first gas fraction is for example separated from the solvent phase by expansion and/or heating in order to enrich the solvent phase.

The process according to the invention is performed for example in temperature ranges at the outlet of stage (b) between for example $-20°$ C. and $-100°$ C.

According to an embodiment of the process, at least stages (b) and (c) are carried out with several operations performed in contact zones, the gas phase $G_1$ obtained at the outlet of contact zone is being sent to the next contact zone $i+1$ and the gas phase $G_2$ enriched in constituents being sent to the previous contact zone $i-1$.

The process is applied for example for treating a gas comprising at least acid gases, the gas phase $G_1$ depleted in constituents comprising at least one acid gas such as carbon dioxide $CO_2$ or hydrogen sulfide $H_2S$, and the solvent S mixed with the gas to be processed is for example a physical solvent such as an alcohol, such as methanol or ethanol, an ether such as methylpropylether, ethylpropylether, methyltertiobutylether or propylene carbonate or methoxyethanol.

It is also possible to apply the process for treating a gas comprising for example at least hydrogen or nitrogen, the fraction separated from the processed gas comprising, for example, at least one hydrocarbon such as methane, ethane, propane, butane and/or pentane, the gas to be processed comprising at least hydrogen and nitrogen.

According to another method of application, the gas to be processed comprises for example water, a water-miscible solvent such as methanol is for example used, and a fraction of the liquid solvent phase S from stage (b) is brought into contact, in a countercurrent contact zone, with at least a fraction of the gas to be processed, by withdrawing for example from the contact zone, for example at the top, a gas loaded with solvent, which is for example sent thereafter to stage (a), and by withdrawing for example from the bottom of the contact zone a substantially solvent-freed aqueous phase.

The present invention also relates to a device for processing a gas G comprising one or more constituents to be removed.

The device is characterized in that it comprises in combination:

at least one heat exchange zone, feed lines feeding the gas to be processed and at least a solvent phase into said exchange zone, means for separating the processed gas and the solvent phase after passage through the exchange zone, the separation means being for example connected to at least a line designed for discharge of the processed gas and a line designed for discharge of the solvent phase enriched in constituents, said enriched solvent phase discharge line being connected to said heat exchange zone, at least one line designed for discharge of the solvent phase that has flowed past said heat exchange zone, means for separating the solvent phase into at least a gas phase and a liquid phase, and lines designed for discharge of the two separated phases, the liquid solvent phase discharge line being connected to the solvent phase feed line.

The heat exchange zone comprises for example one or more plate exchangers.

The device is for example equipped with means for expanding said processed gas phase and/or said solvent phase enriched with at least one of the constituents.

The heat exchange zone is for example designed to achieve a countercurrent circulation of the solvent phase $S_1$ and of the vapour phase generated by heating within the exchange zone.

In relation to the various processes used and described in the prior art, the process according to the invention notably affords the following advantages:

it saves:
  using large-size contact columns under pressure,
  bringing the gas to a sufficiently low pressure prior to implementing the process,
  distillation processes, and it allows:
  to heat the solvent while cooling the mixture of gas and solvent, which allows to improve the solvent power and the selectivity of the solvent used.

BRIEF DESCRIPTION OF THE DRAWINGS

Other features and advantages of the invention will be clear from reading the description hereafter of non-limitative examples, with reference to the accompanying drawings wherein:

FIG. 8 is a variant of FIG. 7, FIG. 9 diagrammatically shows an example of implementation of the process with several stages.

DETAILED DESCRIPTION OF THE INVENTION

FIG. 1 diagrammatically shows a processing method commonly used according to the prior art, which consists in carrying out an absorption stage by bringing the gas to be processed into countercurrent contact with a solvent in a column, the function of the solvent being notably to extract selectively one or more constituents contained in the gas to be processed, then in regenerating the solvent by distillation under reduced pressure.

The gas to be processed is fed into column $C_1$ through line 1, a solvent is introduced at the top of column $C_1$ through line 3 and flows out of the column through line 4 loaded with constituents to be removed from the gas. At the top of column $C_1$, the processed gas, i.e. depleted in constituents, is discharged through line 2. The solvent rich in constituents and coming from the column is passed through exchanger $E_1$, then it is expanded through expansion valve $V_1$. It is then distilled under reduced pressure in column $C_2$. The constituent(s) separated from the processed gas are discharged at the top of column $C_2$ through line 5. The depleted solvent is sucked in at the base of column $C_2$ by circulation pump $P_1$ and recycled to the top of column $C_1$.

The solvent used can be a chemical solvent, for example an amine, or a physical solvent such as an alcohol like methanol, or an ether such as dimethyltetraethylene glycol (DMETEG).

If the solvent is a physical solvent, it is well-known that it is possible, in a certain number of operations, to improve the solvent power and the selectivity of this physical solvent by operating for example at a temperature below the ambient temperature.

Such a process is particularly well-suited for impurities removal or at least for separation of one or more constituents present in relatively small proportions in the gas.

When the contents are high, the process may become expensive notably on account of the necessity of circulating and of distilling large amounts of solvent heavily loaded with constituents to be separated from the gas.

Distillation of the solvent is generally a relatively expensive operation which requires heating the column at the bottom and cooling it at the top.

Figures 2, 3, 5:
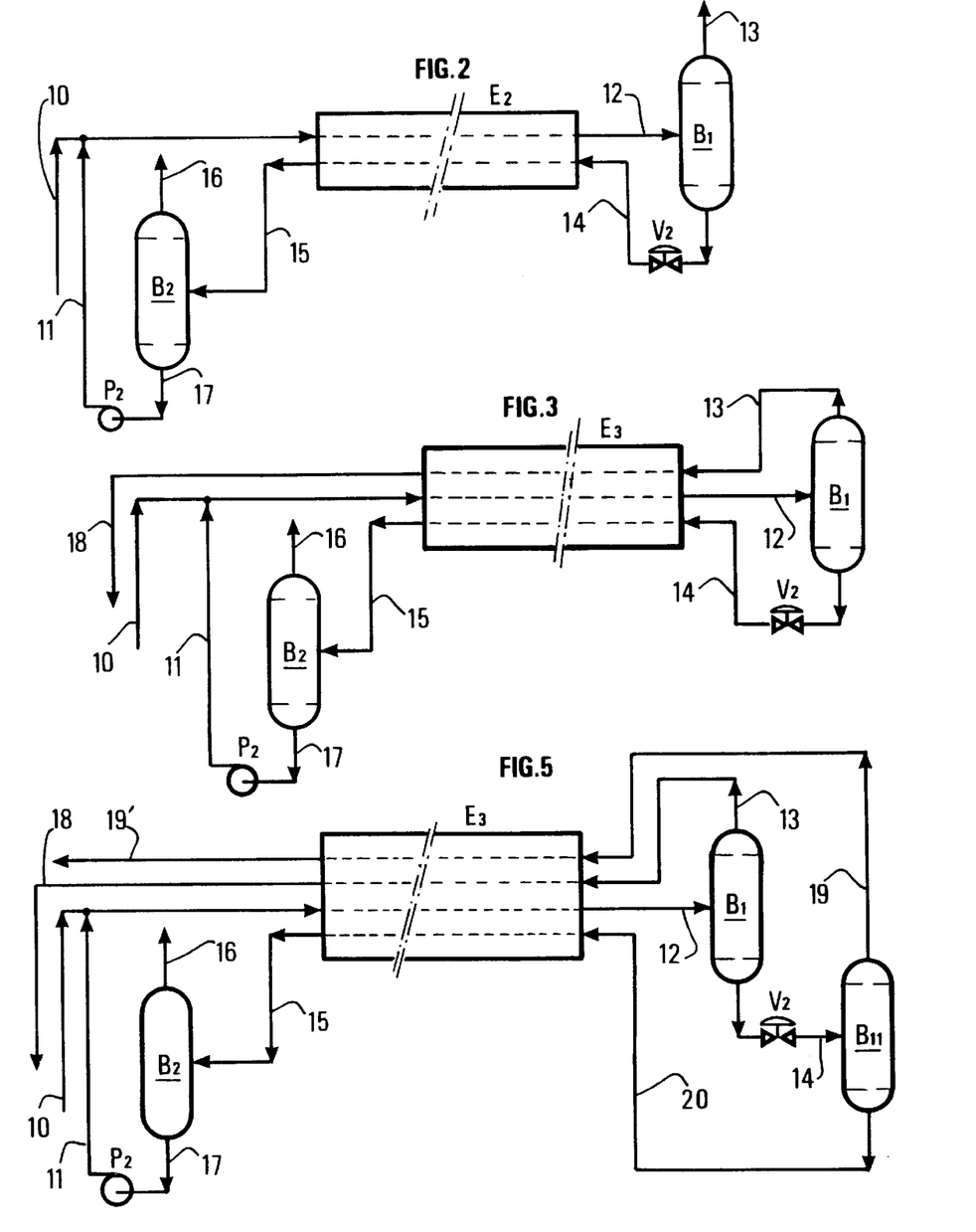
FIG. 2 diagrammatically illustrates the stages of the process according to the invention, notably carried out in a single heat exchange zone.
FIG. 3 shows a variant of implementation of the process where the processed gas is used to help towards refrigeration.
FIG. 5 is given to illustrate a numerical example of implementation of the process, FIG. 6 diagrammatically shows an embodiment variant where the gas stream to be processed is divided prior to implementing the process.

The principle of the process according to the invention, diagrammatically shown in FIG. 2, is explained by way of non limitative example for the processing of a natural gas or of a refinery gas.

The gas to be processed, containing for example at least one constituent A to be removed, such as $CO_2$, flows in through line 10.

It is for example mixed, prior to being fed into exchanger $E_2$, with a liquid solvent S flowing in through line 11 which communicates with line 10. The gas-solvent mixture flows through exchanger $E_2$ where it is cooled by a solvent phase $S_1$ fed into the exchanger through line 14 and circulating in a countercurrent flow in relation to the gas-solvent mixture.

In exchanger $E_2$, the solvent S of the gas-solvent mixture circulating in a cocurrent flow in relation to the gas to be processed collects the constituent(s) to be separated and present in the gas to be processed, entirely or partly. The mixture within the exchanger develops into a mixture made up of a solvent loaded with constituents A to be separated and of a gas depleted in such constituents.

A matter exchange occurs between solvent phase S and the gas to be processed, whereas the heat exchange occurs between the gas-solvent mixture and the solvent phase $S_1$ circulating preferably in a countercurrent flow.

At the outlet of exchanger $E_2$, the gas-solvent mixture is fed into separating drum $B_1$ and separated into a gas phase $G_1$ depleted in constituents A to be separated, which is discharged through line 13, and a solvent phase $S_1$ enriched in constituents A to be separated, discharged through line 14 provided with an expansion valve $V_2$. The expanded solvent phase is fed for example into exchanger $E_2$, where it is heated by heat exchange with the gas-solvent mixture which is cooled. A gas phase $G_2$ rich in constituents A is generated thereby. The enriched in constituents A and heated solvent phase is discharged from exchanger $E_2$ through line 15 and fed into a separating drum $B_2$ at the outlet of which an enriched gas phase $G_2$ is obtained and discharged through line 16, and the solvent phase obtained is discharged through line 17 and possibly recycled by means of a pump $P_2$ through line 11 in order to be mixed with the gas to be processed fed by the conduct 10.

The process according to the example is for example implemented by carrying out at least the following successive stages:

(a) the gas to be processed G is at least partly mixed with a solvent S selected to retain selectively at least one constituent A to be separated, solvent S resulting at least partly from stage (d), (b) the mixture of gas G and of solvent S is cooled by circulating in at least one heat exchange zone so as to obtain, at the outlet of said heat exchange zone, at least a gas phase $G_1$ depleted in at least one of the constituents A to be separated from the gas and a solvent phase $S_1$ enriched in constituents to be separated, (c) said enriched solvent phase $S_1$ is separated from gas phase $G_1$ and the enriched solvent phase $S_1$ is recycled to the heat exchange zone in order to cool the gas-solvent mixture during stage (b), the enriched heated solvent phase $S_1$ being for example made up, at the outlet of the heat exchange zone, of at least a gas phase $G_2$ enriched in constituents to be separated and of a liquid solvent phase S, and (d) gas phase $G_2$ and liquid solvent phase S from stage (c) are separated and the solvent phase at least freed of the constituent(s) to be separated is recycled to stage (a).

The process according to the invention advantageously allows to perform, within the same heat exchange zone, absorption of the constituents to be eliminated of the gas to be processed by the solvent mixed with the gas, this mixture being cooled inside the exchange zone, and the solvent phase enriched in constituents to be separated, used as a cooling agent, is simultaneously regenerated.

As the processed gas $G_1$ leaves separating drum $B_1$ through line 13, it may be advantageous to carry out a heat exchange between this cold gas and the gas-solvent mixture to be cooled, performed for example according to the diagram of FIG. 3.

In this embodiment example, the gas-solvent mixture circulating in exchanger $E_3$ is cooled by heat exchange simultaneously with at least part of the solvent phase $S_1$ from separating drum $B_1$, recycled to exchanger $E_3$ through line 14, and at least part $G_1$ of the processed gas from separating drum $B_1$, recycled through line 13 to exchanger $E_3$. It is also possible to separate the processed gas from drum $B_1$ and to discharge at least a fraction of this gas directly without flowing past the exchanger, whereas a part is recycled to exchanger $E_3$ through line 13. The gas phase is thereafter discharged through line 18 after being heated.

In order to provide at least partial regeneration of the solvent phase and to be able to refrigerate the mixture of gas and solvent, the enriched solvent phase $S_1$ from drum $B_1$ is for example expanded by passing through an expansion valve $V_2$ or in a turbine. In the latter case, the mechanical expansion energy is for example advantageously recovered and used for example to drive pump $P_2$ allowing recycling of the solvent phase freed of at least part of the constituents to be separated in order to be mixed with the gas to be processed.

The heat exchanges performed during stage (b) are preferably carried out by means of a countercurrent circulation of the gas-solvent mixture and of the other fluids, so as to improve the efficiency of the refrigeration and heating operations that are for example carried out simultaneously during stage (b).

The refrigeration necessary to carry out stage (b) can be provided by any means known to the man skilled in the art.

Figure 4:
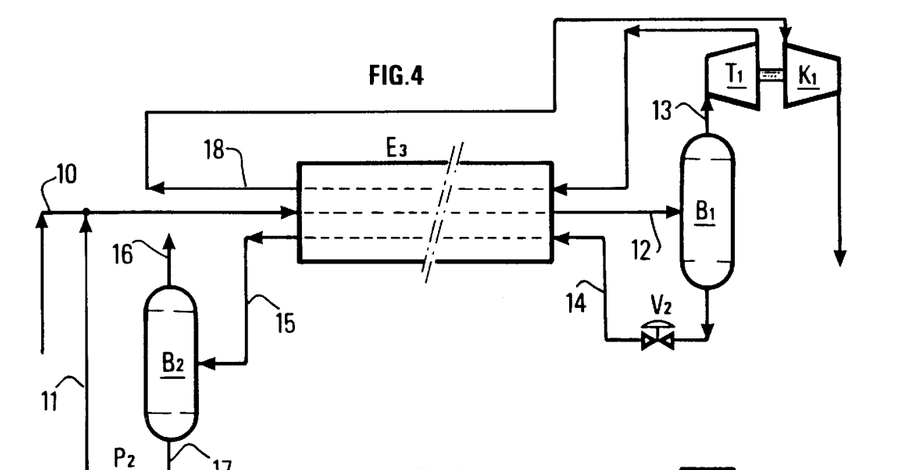
FIG. 4 shows an embodiment variant of FIG. 3.

FIG. 4 shows a variant of FIG. 3 where the gas phase $G_1$ from separating drum $B_1$ is cooled prior to being used to cool at least partly the gas-solvent mixture in exchanger $E_3$.

To that effect, the gas phase from separating drum $B_1$ is fed through a turbine $T_1$ where it is expanded in order to lower its temperature prior to feeding it into exchanger $E_3$. The expansion energy is for example recovered to recompress the gas $G_1$ leaving exchanger $E_3$ through line 18 in compressor $K_1$ which is driven for example by turbine $T_1$.

It is also possible to use this expansion energy for example to recompress the gas fraction $G_2$ fed through line 16, which is enriched in constituents to be separated.

According to another embodiment, a refrigerating fluid coming for example from an external refrigeration cycle can for example be used.

The heat exchanges which are performed during stage (b) can be carried out in one or more heat exchange zones working in parallel and/or in series.

The exchange zone(s) comprise for example one or more shell-and-tube exchangers and/or plate exchangers.

Plate exchangers notably have the advantage of allowing heat exchanges between several fluids as well as countercurrent exchanges.

These heat exchangers can be for example plate exchangers made of soldered aluminium or plate exchangers made of stainless steel for example.

The interest of the process according to the invention will be clear from reading the description hereafter of a numerical example described in connection with FIG. 5, which differs from the device of FIG. 3 in that a separating drum has been added after drum $B_1$.

EXAMPLE 1

A gas to be processed having a molar composition expressed in mole fractions of about 50% of $CH_4$ and 50% of $CO_2$ flows in through line 10 at a pressure of the order of 6 MPa. Prior to being fed into exchange zone $E_3$, it is mixed with a solvent flowing in through line 11.

The solvent consists for example of methanol containing for example 10% of water expressed in mole fraction.

According to a principle substantially identical to that described in FIG. 3, the mixture of gas and solvent is cooled in exchanger $E_3$ to a temperature of $-20°$ C. in this example. In separating drum $B_1$, a gas phase $G_1$ and a solvent phase $S_1$ are separated, the gas phase being discharged through line 13 and the solvent phase through line 14 provided with expansion valve $V_2$.

The mole fraction of $CO_2$ in the processed gas fraction $G_1$ discharged through line 13 eventually represents only 25% of the $CH_4/CO_2$ mixture. This gas fraction is for example fed into exchanger $E_3$ where it is heated prior to being discharged through line 18.

The solvent phase $S_1$ discharged through drum $B_1$ is expanded through valve $V_2$. A liquid solvent phase and a gas phase are thus obtained and separated in separating drum $B_{11}$, the pressure prevailing in the separating drum being 3 MPa in this example.

The gas phase separated in drum $B_{11}$ is discharged through line 19 and fed into exchanger $E_3$ where it is used to cool the gas-solvent mixture. It leaves this exchanger through line 19' prior to being optionally mixed with the gas leaving exchanger $E_3$ through line 18. It can also be used as fuel-gas.

The solvent phase discharged through line 20 is fed into heat exchanger $E_3$ to regenerate at least partly the solvent and to provide at least partial cooling of the gas-solvent mixture. It is regenerated in this exchanger $E_3$ through heat exchange by warming up and by cooling the mixture of gas and solvent circulating therein, for example in a countercurrent flow. After flowing through exchanger $E_3$, a gas phase and a liquid phase are thus obtained and fed through line 15 into separating drum $B_2$ in order to be separated, the solvent phase freed of at least part of the absorbed constituents that are carried along in the gas phase is for example recycled by means of pump $P_2$, for example, to line 11 in order to be mixed with the gas to be processed flowing in through line 10. The $CO_2$-rich gas phase is discharged through line 16.

This example illustrates a procedure consisting, at the end of stage (c), in separating from the solvent phase a first gas fraction by heating and/or expansion in order to enrich for example the solvent phase in constituent(s) to be separated.

Figure 6:
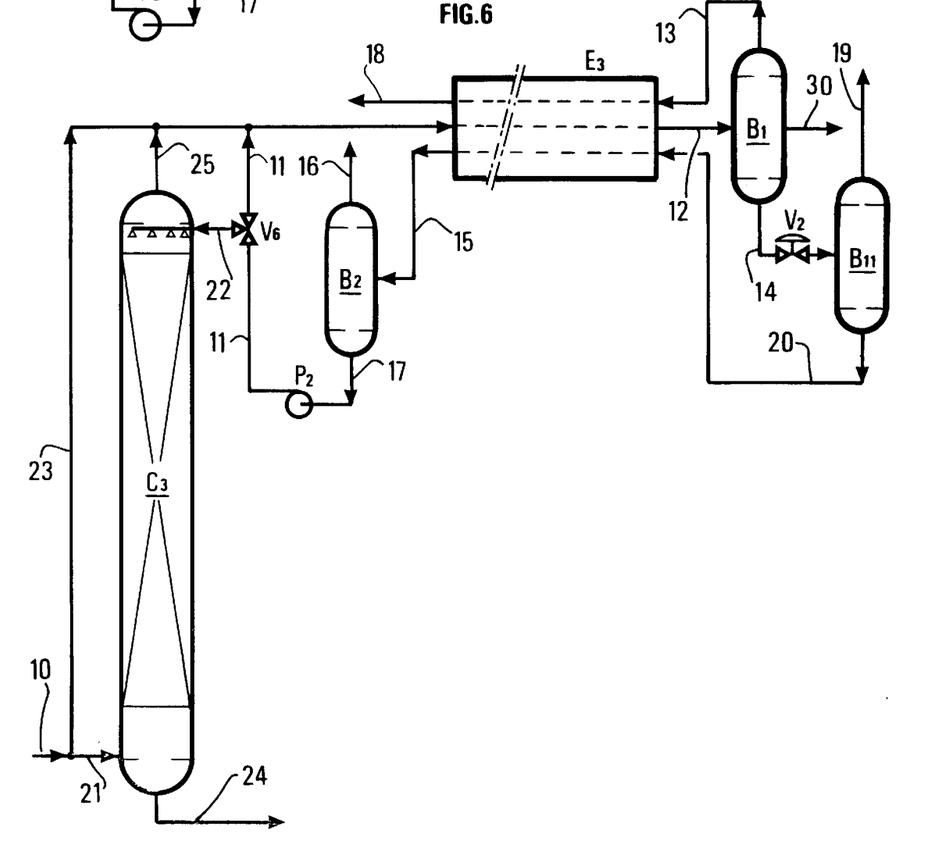

According to another embodiment of the process, it is also possible to process a gas containing water and hydrocarbons heavier than methane and also acid gases. A layout as illustrated in the diagram of FIG. 6, which differs from the processes described in FIGS. 2 to 5 in that it comprises a stage of preliminary separation of the gas to be processed, is used for example.

The gas to be processed is for example separated into two fractions or parts prior to being fed into exchanger $E_3$.

To that effect, the following procedure is implemented:
the gas to be processed flows in through line 10 where it is separated into:
a first fraction $F_1$ representing for example half of the total flow of gas to be processed that is fed through line 21 into contact column $C_3$ where this first fraction is brought into countercurrent contact, for example, with a solvent phase flowing in through line 22, the solvent phase comprising for example a mixture of methanol and water,
a second fraction $F_2$ which is directly fed into exchanger $E_3$ through line 23, the two fractions being brought together prior to being fed into exchanger $E_3$.

In column $C_3$, the first fraction $F_1$ of the gas to be processed becomes loaded with solvent, a substantially solvent-freed aqueous phase is discharged for example at the bottom of the column through line 24 and a gas phase loaded with solvent, which is mixed for example with the second gas fraction flowing through line 23 without flowing through column $C_3$ is discharged at the top of the column through line 25. The gaseous mixture thus obtained is mixed for example with a solvent phase flowing in through line 11. The mixture of gas and solvent is thereafter cooled in exchanger $E_3$ and processed according to the principle of the process described in connection with FIG. 3.

Three phases are thus obtained at the outlet of exchanger $E_3$ and separated in separating drum $B_1$, a gas phase forming the processed gas that is discharged through line 13, a liquid hydrocarbon phase that is discharged through line 30 and a solvent phase enriched in acid gas, for example discharged through line 14. The solvent phase enriched in acid gases is for example expanded by means of valve $V_2$ prior to being fed into separating drum $B_{11}$ at the outlet of which a gas phase is obtained and discharged through line 19, whereas the solvent phase enriched in acid gases is discharged and fed through line 20 into exchanger $E_3$ where it is regenerated, for example according to the layout shown in FIG. 2. At the outlet of separating drum $B_2$, the regenerated solvent phase coming from line 17 and sucked in by pump $P_2$ is divided into at least two fractions by means of distribution valve $V_6$. A first fraction is then flowed through line 11 in order to be mixed with the gas to be processed circulating in line 23, while a second fraction is flowed through line 22 towards the upper part of column $C_3$.

In this example of implementation of the process, the initial mixture of gas and solvent comprises, at the outlet of the heat exchange zone, three phases comprising, besides gas phase $G_1$ and solvent phase $S_1$, a second liquid phase which is withdrawn through line 30 at the outlet of exchanger $E_3$, by separation in drum $B_1$.

More generally, the layout schematized in FIG. 6 notably allows to process a gas containing water, the solvent S used having notably the distinctive feature of being miscible with water. Methanol is for example used by bringing into contact, preferably in a countercurrent contact zone $C_3$, a fraction of the solvent phase from stage (b) and at least a fraction of the gas to be processed, by withdrawing for example at the top of the contact zone $C_3$ a gas loaded with solvent that is recycled to stage (a) and by withdrawing at the bottom of this zone an aqueous phase substantially freed of solvent.

The process according to the invention can also be advantageously used to separate from a gas phase comprising at least one light gas such as hydrogen or nitrogen a fraction enriched in at least one constituent such as methane, ethane, propane, butane and/or pentane, and the solvent used can for example consist of a liquid hydrocarbon phase or of a solvent such as methanol.

When operating for example according to the layout shown in FIG. 6, it is possible to process a natural gas containing nitrogen, water and hydrocarbons heavier than methane.

A methane-enriched gas is discharged through line 16 at the outlet of separating drum $B_2$ and a nitrogen-enriched gas is discharged at the outlet of exchanger $E_3$.

The solvent used for this implementation is for example methanol, or a hydrocarbon or a mixture of hydrocarbons.

The conditions used to perform such a separation are for example illustrated by the following numerical example described in connection with FIG. 5.

EXAMPLE 2

The composition of the gaseous mixture to be processed, flowing in through line 10, expressed in mole fractions, is as follows:
75% $CH_4$,
25% $N_2$.

The input pressure of this gaseous mixture is of the order of 5 MPa. This gaseous mixture is mixed with the solvent flowed in through line 11 and consisting in this example of isopentane.

The mixture of gas and solvent thus obtained is cooled to a temperature of $-110°$ C. inside exchanger $E_3$.

The following phases are obtained at the outlet of separating drum $B_1$:
  a gas phase comprising a nitrogen fraction which represents about 60% in mole fraction of the mixture of methane and nitrogen, this gas fraction being fed into exchanger $E_3$, then discharged through line 18,
  a solvent phase which is expanded by means of valve $V_2$, the vapour phase and the liquid phase resulting from this expansion being separated in separating drum $B_{11}$, the pressure prevailing in this drum being for example 3 MPa.

The solvent phase from separating drum $B_1$ is fed through line 20 into exchanger $E_3$, where it is regenerated by warming up and by cooling the mixture of gas and solvent circulating for example in a countercurrent flow. A gas phase and a liquid phase are thus obtained and separated in separating drum $B_2$. The liquid solvent phase is recycled by means of pump $P_2$ and the gas phase containing about 80% of methane is discharged through line 16.

It is also possible to use a similar layout to separate methane from another light gas such as hydrogen.

It can also be applied to separate other hydrocarbons than methane, for example ethane, propane, butane and/or pentane, from a light gas comprising for example hydrogen or nitrogen.

Processing of the gas and notably separation of at least one of the constituents A thereof can be improved by using one or more stages such as those described in FIGS. 3 and 4, arranged in series for example.

Figure 7:
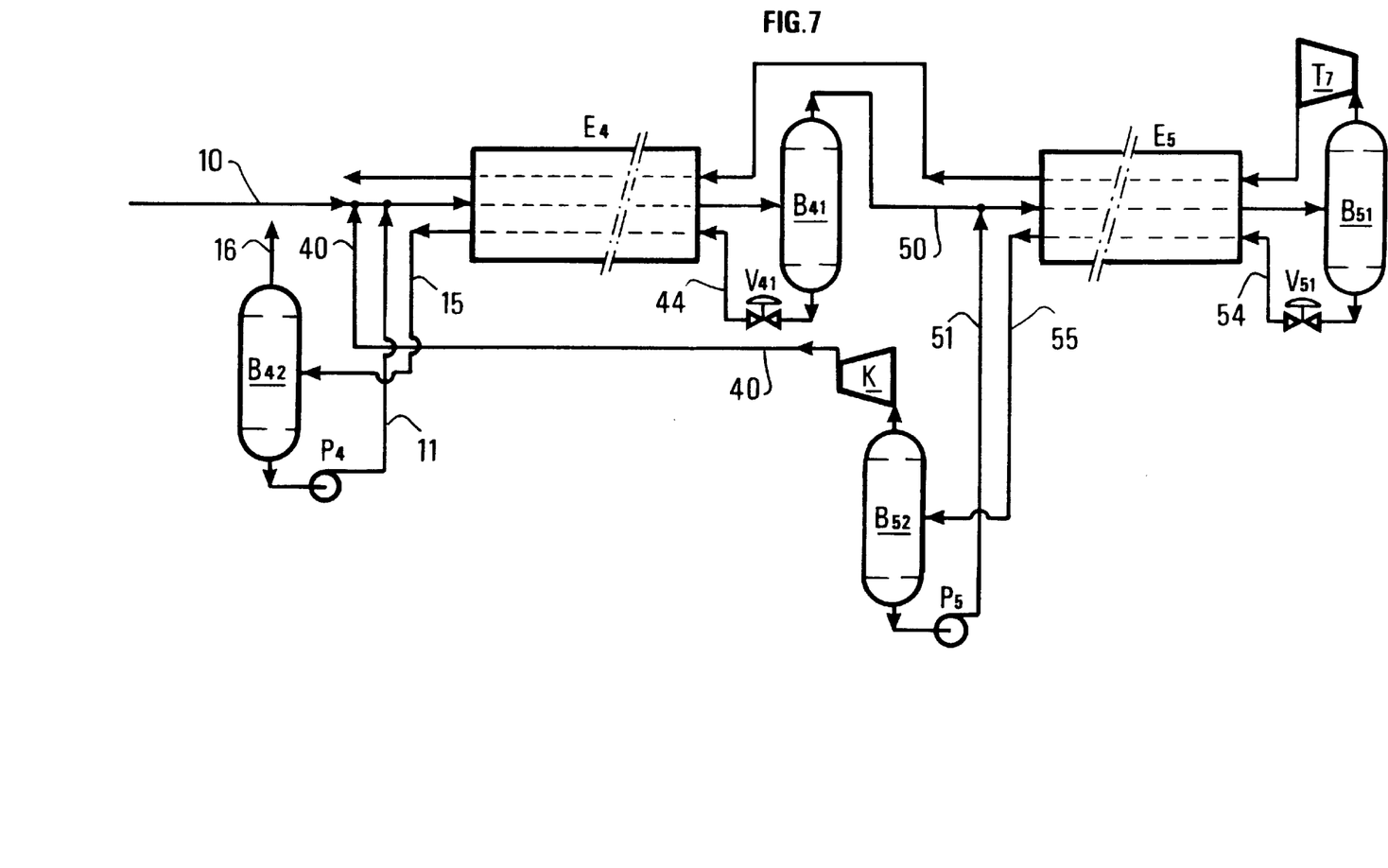
FIG. 7 shows a procedure with two stages.

FIG. 7 diagrammatically illustrates an example of a device variant allowing to operate with two stages arranged one after the other and working according to a principle substantially identical to that described in FIGS. 3 and 4 for example.

The first stage comprises an exchanger $E_4$, a separating drum $B_{41}$ placed after the exchanger, an expansion valve $V_{41}$ placed on return line 44 intended to send the solvent phase back into exchanger $E_4$, a separating drum $B_{42}$ and a recycling pump $P_4$, as well as supply and discharge lines for the various fluids, these various elements being arranged according to a layout similar to that shown in FIG. 2.

The second stage similarly comprises an exchanger $E_5$, a separating drum $B_{51}$ placed after the exchanger, an expansion valve $V_{51}$ placed on the return line 54 intended to send the solvent phase back into exchanger $E_5$, a separating drum $B_{52}$, a compressor K and a recycling pump $P_5$, as well as supply and discharge lines for the various fluids, a turbine $T_7$ or any means allowing a gas phase to be cooled the gas phase being extracted from the separating drum $B_{51}$. These elements and the layout thereof are at least partly described for example in FIGS. 3 or 4.

The processed gas phase coming from turbine $T_7$ is circulated towards exchanger $E_5$, then exchanger $E_4$. The discharge line intended for the processed gas from separating drum $B_{41}$ is connected to the inlet of exchanger $E_5$.

Implementation of the process according to FIG. 7 is performed for example as follows:

The gas to be processed, flowing in through line 10, and at least part of the gas processed in the second stage and recycled through line 40 after flowing inside the compressor K.

A solvent phase that will mix with the combined two gas fractions is introduced through line 11. This gas-solvent mixture is then fed into exchanger $E_4$.

The mixture thus obtained is processed at the level of the first stage $E_4$ according to a procedure identical to that described in connection with FIG. 2 for example. The mixture is cooled in exchanger $E_4$ by heat exchange with a solvent phase $S_1$ coming from separating drum $B_{41}$, which was expanded by means of expansion valve $V_{41}$ prior to being reinjected into exchanger $E_4$. At the outlet of exchanger $E_4$, the mixture of processed gas and the solvent phase are separated in a separating drum $B_{42}$ according to steps described on FIG. 2.

During the heat exchange in exchanger $E_4$ the solvent phase $S_1$ is heated and at the outlet of exchanger $E_4$, it exhibits a liquid-vapour form fed into separating drum $B_{42}$ where it is separated into at least a gas fraction enriched in constituents to be separated, which is discharged through line 16, and a solvent phase S freed from at least part of the constituent(s) carried along in the gas phase. This cleaned solvent phase being recycled by means of pump $P_4$ towards line 11 in order to be mixed with the gas mixture to be processed.

The gas fraction resulting from the separation operation in separating drum $B_{41}$ is sent, totally or partly, through line 50 to the second stage and notably fed into the second exchanger $E_5$. It is previously mixed with a solvent flowed in through line 51.

The mixture of gas to be processed and of solvent is cooled in exchanger $E_5$ by heat exchange with the solvent phase flowed in through line 54 on the one hand and with at least part of the gas fraction coming from separating drum $B_{51}$ on the other hand, and cooled by a turbine $T_7$.

The mixture obtained at the outlet of exchanger $E_5$ is separated in separating drum $B_{51}$ at the outlet of which a gas phase and a solvent phase are obtained, said phases being respectively sent to the turbine $T_7$ and the expansion valve $V_{51}$.

The gas phase is for example expanded through turbine $T_7$ prior to being fed into exchanger $E_5$ in order to be used as a refrigeration agent, where it is cooled and thereafter fed into the heat exchanger $E_4$ of the first stage.

The solvent fraction from separating drum $B_{51}$ after being expanded through expansion valve $V_{51}$ is fed through line 54 into exchanger $E_5$ where it is regenerated by warming up through heat exchange with the gas-solvent mixture. The liquid-vapour mixture thus obtained is thereafter discharged through line 55 towards separating drum $B_{52}$. After separation, the gas phase obtained is fed into the compressor K in order to be recompressed prior to being mixed with the gas to be processed and the solvent phase obtained is for example sucked in and recycled by a pump $P_3$ and the line 51 at the inlet of exchanger $E_5$ to gas feed line 50 where it is mixed with the gas.

In the diagram of FIG. 7, each of the stages $E_4$, $E_5$ comprises an independent solvent circulation loop allowing for example to inject a solvent at the level of each stage. It is also possible to operate with a single loop by feeding the solvent only into the first stage of the process and by recovering it for example at the level of the last stage.

Figure 8:
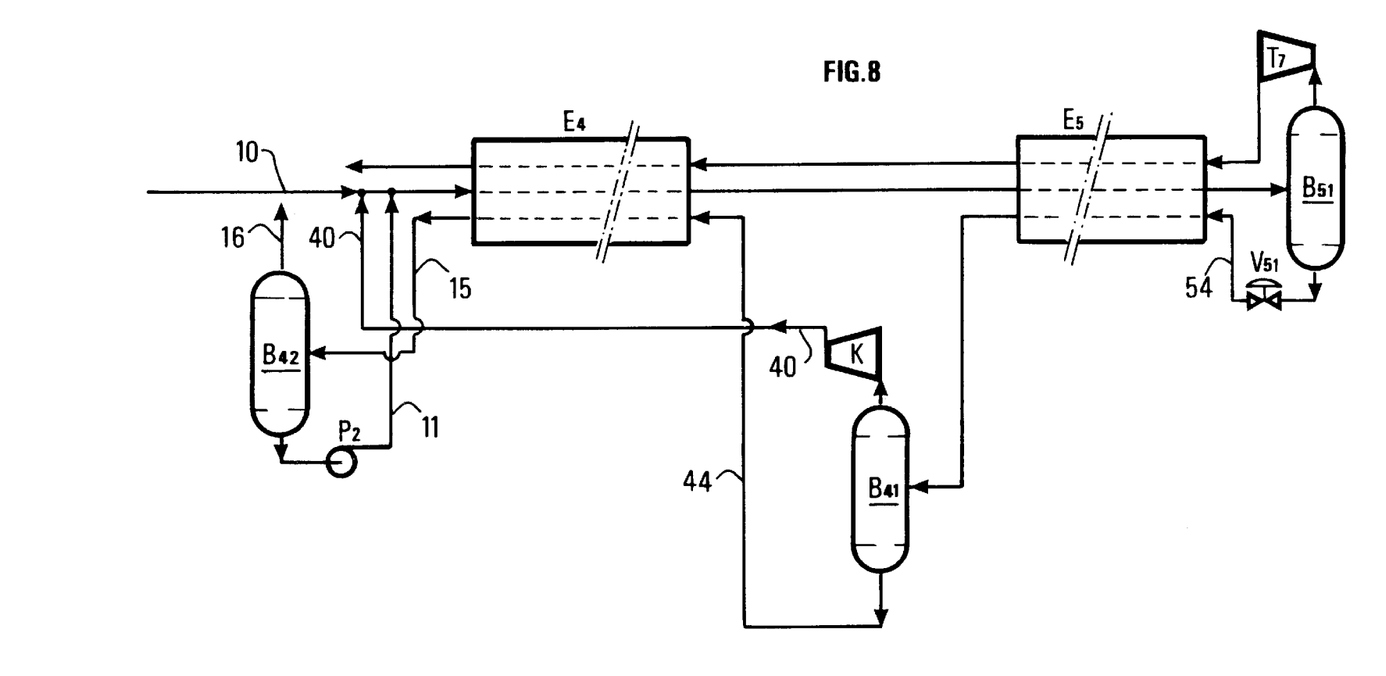

FIG. 8 shows another embodiment example where the solvent phase is separated, at the outlet of the exchanger $E_5$ of the second stage, in separating drum $B_{51}$. It is then expanded and fed into exchanger $E_5$ to cool the mixture of gas to be processed and of solvent. At the outlet of exchanger $E_5$, the solvent phase in liquid-vapour form is fed into separating drum $B_{41}$ at the outlet of which a solvent fraction is obtained and recycled through line 44 to the exchanger $E_4$ of the first stage.

Figure 9:
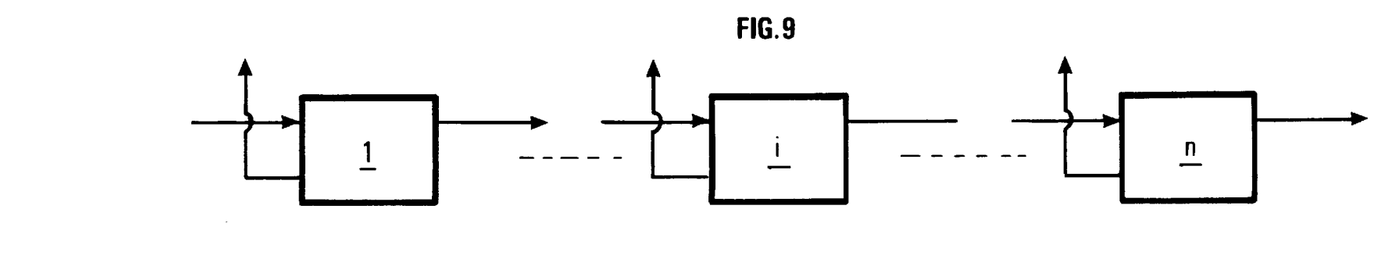

FIG. 9 schematizes the possibility of operating with any number n of stages.

The gas depleted in at least one constituent, for example constituent A, to be separated coming from a stage i is sent to the next stage i+1, while the gas enriched in constituent A to be separated coming from a stage i is sent to the previous stage i−1.

Figure 10:
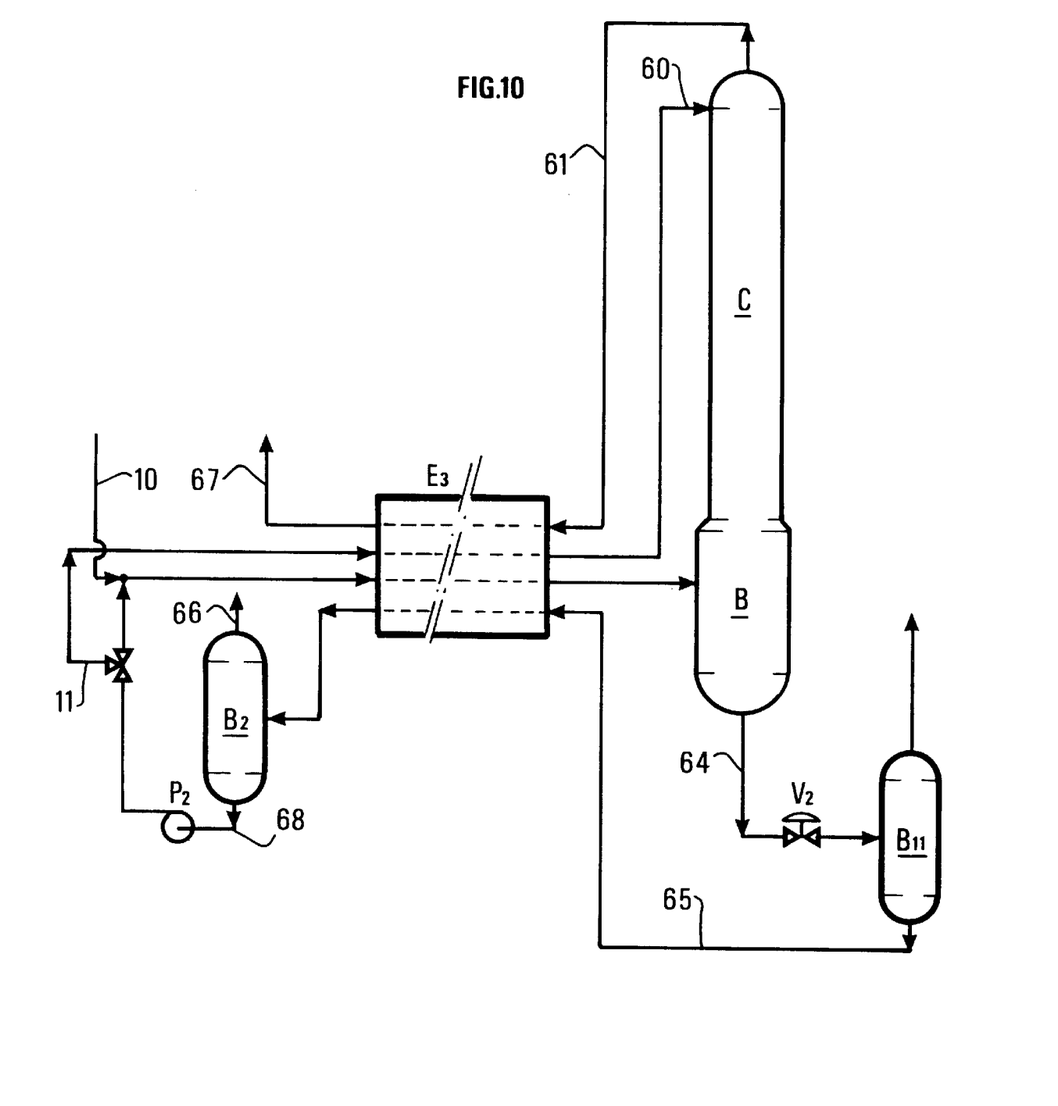
FIG. 10 is an embodiment variant where the processed gas is simultaneously brought into contact with the solvent and separated therefrom.

FIG. 10 schematizes a particular embodiment of the process suited to reduce the proportion of at least one constituent A to be separated from the gas to be processed, comprising a stage of countercurrent contacting between the gas phase $G_1$ and a fraction at least of the solvent phase $S_1$.

It is carried out for example as follows:

The gas to be processed flowing in through line 10 is mixed with a solvent flowing in through line 11 prior to being fed into exchanger $E_3$. The gas-solvent mixture thus obtained is cooled in this exchanger and thereafter fed into a separating drum B comprising a contact zone C, for example at the level of the upper part thereof.

The gas fraction resulting from the separation of the mixture in the drum is brought into countercurrent contact for example, in contact zone C, with a solvent phase flowing in from the upper part of the drum through line 60. At the top of this contact zone, the processed gas is discharged from the drum through line 61 and fed into exchanger $E_3$ where it is notably used as a refrigeration agent and which it leaves through line 67.

The separated solvent phase discharged through line 64 is expanded by means of an expansion valve $V_2$ for example provided in the line, the liquid-vapour mixture obtained by expansion is then fed into separating drum $B_{11}$. The solvent phase obtained at the outlet of this separating drum is discharged through line 65 and fed into exchanger $E_3$ where it is regenerated by heat exchange with the mixture of gas to be processed and of solvent. The liquid-gas mixture thus obtained is thereafter separated in separating drum $B_2$, at the outlet of which a gas phase rich in constituent A is discharged through line 66 and a solvent phase freed of at least part of constituent A is sucked in by pump $P_2$ in order to be divided into several fractions by means of a distribution valve V for example. A solvent fraction at least partly freed of constituent is thereafter fed through line 11 to be mixed with the gas to be processed, whereas a part thereof is fed into exchanger $E_3$, cooled in this exchanger and introduced for example at the top of the contact zone C of separating drum B.

Contact zone C consists for example of a packed column element or of a plate column element.

It can also consist for example of a vertically arranged exchanger working for example as a column exchanger. The channels of this exchanger, which is for example a plate exchanger, serve alternately to pass the cold gas flowing out for example at the top of the contact zone, which may have been subjected to a complementary refrigeration stage, by expansion for example, and to perform countercurrent contact between the gas and the solvent.

Solvent phase $S_1$ can for example be subjected to an additional regeneration stage by expansion and/or heating, for example in an exchanger heated by means of an external fluid or in a distillation column.

Similarly, the gas phases $G_1$ and $G_2$ can be subjected to a complementary rectification stage for example in order to recover at least part of the solvent carried along.

Figure 11:
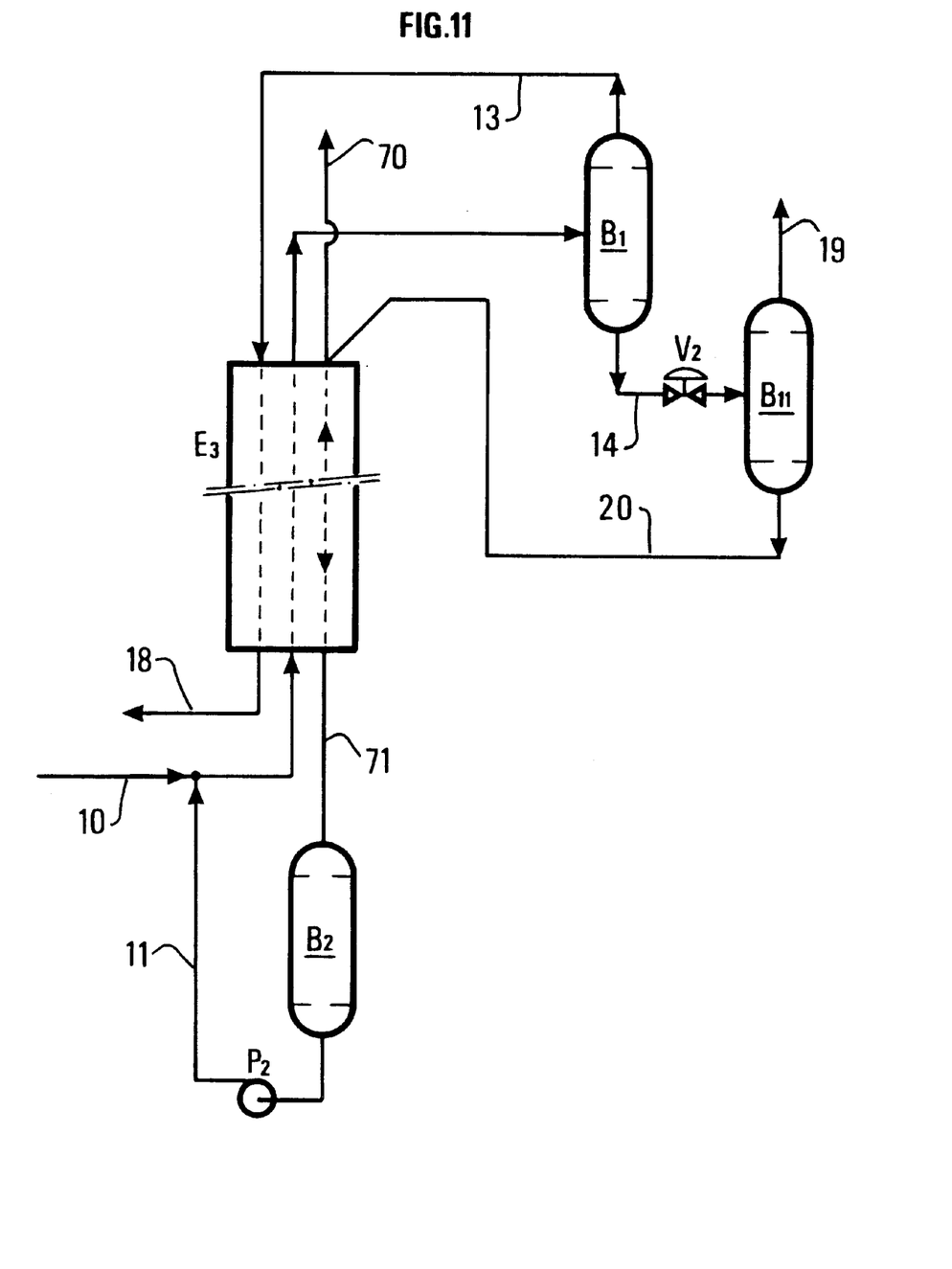
FIG. 11 is an embodiment variant where the solvent phase enriched in constituents is freed of the latter in the heat exchange zone.

FIG. 11 schematizes an embodiment variant having notably the advantage of performing simultaneously separation of the gas phase $G_2$ generated by heating while flowing through a zone of heat exchange of the liquid solvent phase, by means of a countercurrent circulation of gas phase $G_2$ with respect to the liquid solvent phase S.

To that effect, the heat exchange zone is for example positioned so as to allow this countercurrent circulation to be obtained, for example by placing the exchanger in a substantially vertical or inclined position.

The liquid solvent phase will follow a descending flow whereas gas phase $G_2$ exhibits an ascending countercurrent circulation. This notably allows to discharge the vapour phase generated on the coldest side of the exchanger or of the exchange zone and notably to limit the solvent content of the vapour phase discharged.

Exchanger $E_3$ is for example positioned vertically.

According to an embodiment of the process substantially identical to that described in FIGS. 3 or 4, the gas to be processed flowing in through line 10 is mixed with a solvent flowing in through line 11 prior to being fed into exchanger $E_3$.

In accordance with the process described above, the solvent phase from separating drum $B_{11}$ is introduced for example at the top of exchanger $E_3$ and circulates in a descending flow in $E_3$. The vapour phase generated by heating exhibits a countercurrent circulation.

Exchanger $E_3$ is for example a plate exchanger, the space between the plates being sufficient to obtain a velocity of flow of the vapour phase preventing carry-over of the liquid phase.

At the top of exchanger $E_3$, the gas phase or the vapour phase is for example recovered through line 70, and the regenerated solvent phase is recovered at the bottom of exchanger $E_3$ through line 71 and recycled by pump $P_2$.

The various embodiments can be advantageously used to process various types of gas, for example a methane-rich natural pressurized gas, a refinery gas or a synthesis gas containing hydrogen.

The constituent(s) to be separated from the gas to be processed are for example acid gases such as $CO_2$ and/or $H_2S$.

In this case, the solvent used is a chemical or a physical solvent.

A physical solvent is preferably used, for example an alcohol such as methanol or ethanol, an ether such as, for example, methylpropylether, ethylpropylether, methyltertiobutylether, propylene carbonate, methoxyethanol.

The constituent(s) to be separated from the gas to be processed can also be hydrocarbons such as ethane, propane, butane, which are for example separated from methane. One of the constituents to be separated may also be methane, which can be separated for example from a gas containing hydrogen or nitrogen.

In this case, the solvent is for example a light gasoline consisting for example of a hydrocarbon cut with five and six atoms of carbon per molecule, or another physical solvent such as methanol for example.

The pressure under which the separation is performed (pressure of the gas to be processed) ranges for example between 2 and 10 MPa. The mixture of gas and of solvent is refrigerated to a temperature ranging for example between −20 and −100° C.

The process according to the invention is also advantageously applied in order to process a gas comprising several constituents and notably to separate from this gas a fraction comprising for example carbon dioxide $CO_2$ and hydrogen sulfide $H_2S$ or sulfur dioxide $SO_2$, or a fraction made up of a mixture of hydrocarbons, of a gas comprising for example various constituents in admixture such as, for example, methane and hydrogen or methane and nitrogen.

Stepwise operation also allows to separate gas fractions of different compositions, for example a first $CO_2$-enriched gas fraction, then a second $H_2S$-enriched gas fraction.

We claim:

1. A treating process for processing a gas G comprising one or more constituents A to be separated, comprising at least the following stages:
   (a) the gas to be processed (G) is mixed at least partly with a solvent S selected to retain selectively at least one of the constituents to be separated, said solvent S resulting at least partly from stage (d),
   (b) the mixture of gas (G) and of solvent (S) is cooled by circulating in at least one heat exchange zone so as to obtain, at the outlet of said heat exchange zone, at least a gas phase ($G_1$) depleted in at least one of the constituents to be separated and a solvent phase ($S_1$) enriched in constituents to be separated,
   (c) said enriched solvent phase ($S_1$) is separated from said gas phase ($G_1$) said enriched solvent phase ($S_1$) being recycled to the heat exchange zone in order to cool said gas-solvent mixture (stage b), said solvent phase ($S_1$) consisting, at the outlet of the heat exchange zone, of at least a gas phase $G_2$ enriched in constituents A to be separated and of a liquid solvent phase S, and
   (d) the gas phase $G_2$ and the liquid solvent phase S from stage (c) are separated and the solvent phase at least partly freed of constituent(s) to be separated is recycled to stage (a).

2. A process as claimed in claim 1, wherein at least part of said solvent phase ($S_1$) from stage (c) is expanded prior to being recycled to stage (b).

3. A process as claimed in claim 1, wherein the gas-solvent mixture and the solvent phase used as a refrigeration agent are circulated in a countercurrent flow during stage (b).

4. A process as claimed in claim 1, wherein at least part of the gas phase $G_1$ from stage (b) is cooled, preferably by expansion through a turbine, and fed into the heat exchange zone in order to cool the gas-solvent mixture.

5. A process as claimed in claim 1, wherein a first gas fraction is separated at the end of stage (c) from the solvent phase by expansion and/or by heating in order to enrich the solvent phase in constituents A.

6. A process as claimed in claim 1, wherein the operating temperature at the end of stage (b) ranges between $-20°$ C. and $-100°$ C.

7. A process as claimed in claim 1, wherein stages (b) and (c) at least are repeated during several operations performed in contact zones i, the gas phase $G_1$ obtained at the outlet of contact zone i being fed into the next contact zone i+1 and the gas phase $G_2$ enriched in constituents being fed into the previous contact zone i-1.

8. A process as claimed in claim 1 for processing a gas comprising at least one acid gas, wherein gas phase $G_1$ is depleted in constituents comprising at least one acid gas such as carbon dioxide $CO_2$ or hydrogen sulfide $H_2S$, and the solvent S used and mixed with the gas to be processed is a physical solvent such as an alcohol, for example methanol or ethanol, an ether such as methylpropylether, ethylpropylether, methyltertiobutylether, or propylene carbonate or methoxyethanol.

9. A process as claimed in claim 1 for processing a gas comprising at least hydrogen and nitrogen and wherein said fraction separated from the processed gas comprises at least one hydrocarbon such as methane, ethane, propane, butane and/or pentane, the gas to be processed comprising at least hydrogen and nitrogen.

10. A process as claimed in claim 1 for processing a gas comprising at least water, wherein:
    a water-miscible solvent such as methanol is used and before steps a) or b) to be realized,
    said gas is separated in a first fraction F1, and a second fraction F2,
    a fraction of the liquid solvent phase $S_1$ from stage (b) is brought into contact, in a countercurrent contact zone ($C_3$), with at least said first fraction $F_1$ of the gas to be processed, by withdrawing from said contact zone ($C_3$) a gas loaded with solvent, said gas loaded with solvent being thereafter mixed with said second fraction $F_2$ and sent to stage (a), and
    from said contact zone ($C_3$) an aqueous phase substantially freed of solvent is separated.

11. A device for processing a gas G comprising one or more constituents to be removed, comprising in combination:
    at least one heat exchange zone ($E_3$),
    feed lines (10, 11) for feeding the gas to be processed and at least one solvent phase into said exchange zone ($E_3$),
    separation means ($B_1$) for separating the processed gas and the solvent phase after passage through exchange zone ($E_3$), said separation means being connected to at least one discharge line (13) for discharging the processed gas and one discharge line (14) for discharging the solvent phase enriched in constituents, said line intended for discharge of the enriched solvent phase being connected to said heat exchange zone,
    at least one discharge line (15) for discharging the solvent phase that has flowed through said heat exchange zone ($E_3$), separation means ($B_2$) for separating said solvent phase into at least a gas phase and a liquid phase, and discharge lines (16, 17) for discharging the two separated phases, the line intended for discharge of the liquid solvent phase (17) being connected to feed line (11).

12. A device as claimed in claim 11, wherein the heat exchange zone comprises at least one plate exchanger.

13. A device as claimed in claim 11, comprising expansion means (T, $V_2$) for expanding said processed gas phase and/or said solvent phase enriched in at least one of the constituents.

* * * * *